United States Patent [19]

Miyashita et al.

[11] Patent Number: 5,219,929

[45] Date of Patent: Jun. 15, 1993

[54] SAPONIFIED ETHYLENE/VINYL ACETATE COPOLYMER AND POLYAMIDE-BASED RESIN COMPOSITION

[75] Inventors: Kazuhisa Miyashita; Kenji Mori, both of Tsuchiura, Japan

[73] Assignee: Mitsubishi Kasei Polytec Company, Tokyo, Japan

[21] Appl. No.: 529,954

[22] Filed: May 29, 1990

[30] Foreign Application Priority Data

May 31, 1989 [JP] Japan ................................. 1-137648

[51] Int. Cl.⁵ ............................................ C08L 77/00
[52] U.S. Cl. ........................................ 525/57; 525/58
[58] Field of Search ........................................... 525/57

[56] References Cited

U.S. PATENT DOCUMENTS 3,676,400 7/1972 Kohan et al. .................... 525/183
4,764,406 8/1988 Hisazumi et al. ................ 525/57

Primary Examiner—Ana L. Carrillo
Attorney, Agent, or Firm—Burgess, Ryan & Wayne

[57] ABSTRACT

Disclosed is a resin composition comprised of (a) 5 to 95 weight % of a saponified ethylene/vinyl acetate copolymer, (b) 95 to 5 weight % of a polyamide resin in which the content (in μ-equivalent/g of the polymer) of the terminal amino group in the molecule is larger than the content (in μ-equivalent/g of the polymer) of the terminal carboxyl group in the molecule, and (c) 0.5 to 10 weight % of a modified polyolefin formed by grafting an unsaturated carboxylic acid, or an acid anhydride or salt thereof onto a polyolefin. The resin composition can be stably shaped for a long time by extrusion.

14 Claims, No Drawings

SAPONIFIED ETHYLENE/VINYL ACETATE COPOLYMER AND POLYAMIDE-BASED RESIN COMPOSITION

BACKGROUND OF THE INVENTION (1) Field of the Invention

The present invention relates to a resin composition having a superior shapability and a shaped article obtained therefrom. More particularly, it relates to a resin composition which can be stably shaped over a long time by the melt extrusion method without an occurrence of gelation or other problems, and to a resin shaped article, such as a sheet or a film, obtained by melt-extruding this resin composition.

A resin composition comprising a saponified ethylene/vinyl acetate copolymer and a polyamide is provided with the high oxygen gas barrier property and high oil resistance characteristic of the saponified ethylene/vinyl acetate copolymer and the high strength and toughness characteristic of the polyamide, and this composition is highly transparent. Accordingly, this composition has attracted attention as a material for a food-packaging film or sheet and vessels used for various purposes, and the development of compositions of this type is underway.

2) Description of the Related Art

For example, Japanese Examined Patent Publication No. 44-24277 discloses the preparation of a film from a resin composition comprising a saponified ethylene/vinyl acetate copolymer having an ethylene content of 10 to 58 mole % and a saponification degree of at least 90 mole % and a polyamide, and Japanese Unexamined Patent Publication No. 54-16576 discloses the preparation of a film from a resin composition obtained by blending a saponified ethylene/vinyl acetate copolymer having an ethylene content of 20 to 45 mole % and a saponification degree of at least 95% with a polyamide resin having a melting point of 90° to 180° C.

These resin compositions, however, do not have a good processability, and therefore, cannot be regarded as having a high practical utility. More specifically, when a melt extrusion of these resin compositions is continuously carried out for a long time, a gel is formed in the melt and the gel is accumulated in a screw zone of an extruder or an extruding zone of a die, resulting in a lowering of the physical properties of the obtained shaped article, and if the formation of a gel is serious, a screen or nozzle of an extruder becomes clogged, and it is necessary to at once stop the operation, disassemble the extruder, remove the clogging substances, and restart the operation. Namely, the long-run property during melt extrusion is poor.

To solve this problem, Japanese Unexamined Patent Publication No. 62-7761 proposes a mixed resin composition comprising an α-olefin type ionomer resin as a third component, and Japanese Unexamined Patent Publication No. 62-106994 proposes a resin composition comprising a polyamide resin in which the contents of the terminal carboxyl group and terminal amino group satisfy a requirement represented by a specific relational expression.

Nevertheless, these resin compositions are unsatisfactory in that, in the former resin composition, the mixing ratios of the respective components are limited within very narrow ranges, and outside these ranges, the obtained shaped article becomes hazy. Furthermore, in the latter resin composition, it has been found that, when the melt extrusion processing is conducted for a long time, the formation of a gel cannot be avoided.

Moreover, even though the formation of a gel is not serious enough to clog the screw or nozzle of the extruder, surface roughening of an obtained shaped article such as a sheet or film occurs, and breaking occurs at the gelled portion at the drawing step or the step of heat-setting the drawn product. Namely, these resin compositions have a poor long-run property for a melt extrusion processing.

SUMMARY OF THE INVENTION

An object of the present invention to overcome the above-mentioned defects of the conventional technique, and to provide a resin composition which can be stably shaped for a long time by extrusion molding without the formation of a gel or the like and provide a resin shaped article, such as a film or sheet, having a high transparency, superior mechanical properties such as high strength and toughness, and a high oxygen barrier property.

With a view to overcoming the above-mentioned defects of the conventional technique, investigations were made into the mixing ratio between a saponified ethylene/vinyl acetate copolymer (hereinafter referred to as "EVOH") and a polyamide resin, the kind of the polyamide resin and the addition of a third component, and as a result, it was found that a composition comprising a polyamide resin in which the content of the terminal amino group (in $\mu$-equivalent/g of the polymer) in the molecule is larger than the content of the terminal carboxyl group (in $\mu$-equivalent/g of the polymer) in the molecule (hereinafter referred to as "EN-amide resin") and a modified polyolefin (hereinafter referred to as "modified PO") obtained by graft-polymerizing an unsaturated carboxylic acid onto a polyolefin as the third component, in which the mixing ratio among EVOH, EN-amide resin and modified PO is set within a specific range, has a superior melt-extrusion processability.

In accordance with the present invention, there is provided a resin composition comprising (a) 5 to 95% by weight of a saponified ethylene/vinyl acetate copolymer, (b) 95 to 5% by weight of a polyamide resin in which the content (in $\mu$-equivalent/g of the polymer) of the terminal amino group in the molecule is larger than the content (in $\mu$-equivalent/g of the polymer) of the terminal carboxyl group in the molecule, and (c) 0.5 to 10% by weight of a modified polyolefin formed by grafting an unsaturated carboxylic acid, or an acid anhydride or salt thereof onto a polyolefin; the amount of each of the components (a), (b), and (c) being based on the weight of the total amount of the components (a), (b) and (c).

Furthermore, in accordance with the present invention, there is provided a resin shaped article formed by melt-extruding the above-mentioned resin composition.

DESCRIPTION OF THE PREFERRED EMBODIMENTS

The EVOH used in the present invention is prepared by saponifying the vinyl acetate residue of an ethylene/vinyl acetate copolymer, and any EVOH that is widely used for the formation of a film can be used without a particular limitation. Namely, an EVOH having an appropriate ethylene content and saponification degree is selected in view of the drawability of the film or sheet formed by the melt extrusion and the oxygen gas barrier property of the target drawn film. In the present invention, an EVOH having an ethylene content of 20 to 70 mole %, especially 25 to 60 mole %, and a saponification degree of at least 90 mole %, especially at least 95 mole %, is preferably used.

If the ethylene content of EVOH is lower than 25 mole %, the melt extrudability of the resin composition having this EVOH becomes poor and coloring often occurs, and if the ethylene content of EVOH is lower than 20 mole %, this tendency becomes conspicuous. If the ethylene content of EVOH exceeds 60 mole %, the oxygen gas barrier property and printability of a film prepared from the resin composition comprising this EVOH become poor, and if the ethylene content of EVOH exceeds 70 mole %, this tendency becomes conspicuous. If the saponification degree of EVOH is lower than 95 mole %. the oxygen gas barrier property and moisture resistance of the obtained film become poor, and if the saponification degree is lower than 90 mole %, this tendency becomes conspicuous.

The EVOH used in the present invention can comprise a minor amount of units derived from an α-olefin such as propylene, isobutene, α-octene, α-dodecene or α-octadecene or other copolymerizable component.

By the EN-amide resin (b) used in the present invention is meant a polyamide resin in which the content of the terminal amino group (in μ-equivalent/g of the polymer) in the molecule is larger than the content of the terminal carboxyl group (in μ-equivalent/g of the polymer) in the molecule. For example, a polyamide obtained by polycondensation of a lactam having at least three-membered ring or an ω-amino acid and a polyamide formed by polymerization or copolymerization of a nylon salt composed of a dicarboxylic acid and a diamine, which are prepared so that the content of the terminal amino group (μ-equivalent/g of the polymer) in the molecule is larger than the content of the terminal carboxyl group (μ-equivalent/g of the polymer) in the molecule, are preferably used.

The absolute value of each of the contents (μ-equivalent/g of the polymer) of the terminal amino and carboxyl groups in the molecule of the EN-amide resin (b) used in the present invention is not particularly critical, but an EN-amide resin in which the content of the terminal carboxyl group is not larger than 50 μ-equivalent/g of the polymer, especially not larger than 30 μ-equivalent/g of the polymer, is preferably used.

When a lactam having at least 3 rings or an ω-amino acid is used as the starting monomer for the preparation of the EN-amide resin (b), the monomer is polymerized or copolymerized in the presence of a diamine, and when a nylon salt derived from a dicarboxylic acid and a diamine is used as the starting monomer for the preparation of the EN-amide resin, the monomer is polymerized or copolymerized in the presence of an excessive amount of the diamine.

As the starting compound used for the production of the EN-amide resin (b), there can be mentioned lactams having at least 3 rings, such as ε-caprolactam, enantholactam, capryl lactam, lauryl lactam, α-pyrrolidone, and α-piperidone, ω-amino acids such as 6-aminocaproic acids 7-aminoheptanoic acid, 9-aminononaoic acid, and 11-aminoundecanoic acid, dicarboxylic acids, for example, aliphatic dicarboxylic acids such as malonic acid, succinic acid, glutaric acid, adipic acid, pimelic acid, suberic acid, azelaic acid, sebacic acid, undecanedionic acid, dodecanedionic acid, tridecanedionic acid, tetradecanedionic acid, hexadecanedionic acid, hexanedecenedionic acid, octadecanedionic acid, octadecenedionic acid, eicosanedionic acid, eicosenedionic acid, docosanedionic acid, and 2,2,4-trimethyladipic acid, alicyclic dicarboxylic acids such as 1,4-cyclohexanedicarboxylic acid, and aromatic dicarboxylic acids such as terephthalic acid, isophthalic acid, phthalic acid, and xylylene-dicarboxylic acid; and diamines, for example, aliphatic diamines such as ethylenediamine, trimethylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, tridecamethylenediamine, hexadecamethylenediamine, octadecamethylenediamine, 2,2,4-trimethylhexamethylenediamine and 2,2,4-trimethylhexamethylenediamine, alicyclic diamines such as cyclohexanediamine and bis-(4,4,'-aminohexyl)methane, and aromatic diamines such as xylylenediamine.

The contents of the terminal amino and carboxyl groups in the prepared EN-amide resin (b) can be measured by a method in which the amide resin is dissolved in phenol and titration is carried out with 0.05N hydrochloric acid, and a method in which the amide resin is dissolved in benzyl alcohol and titration is carried out with 0.1N caustic soda, respectively.

The modified PO used in the present invention means a modified polyolefin formed by graft-polymerizing an unsaturated carboxylic acid onto a polyolefin. As the polyolefin, there can be used homopolymers and copolymers of an olefin, such as high-density polyethylene, low-density polyethylene, linear low-density polyethylene, an ethylene/vinyl acetate copolymer, and polypropylene. Of these, low-density polyethylene and an ethylene/vinyl acetate copolymer are preferably used. As the unsaturated carboxylic acid to be grafted onto the polyolefin, there can be mentioned acrylic acid, methacrylic acid, maleic acid, fumaric acid, itaconic acid, and citraconic acid. Acid anhydrides and metal salts thereof can also be used. A modified polyolefin prepared by using maleic anhydride is preferably used.

The content of the unsaturated carboxylic acid in the modified PO is preferably 0.01 to 5% by weight and more preferably 0.1 to 3% by weight. A modified PO having an unsaturated carboxylic acid content lower than 0.1% by weight has a poor compatibility with the EVOH (a) and the EN-amide resin (b), and the obtained resin composition becomes hazy, and this tendency is conspicuous in a modified PO having an unsaturated carboxylic acid content lower than 0.01% by weight. A modified PO having an unsaturated carboxylic acid content higher than 5% by weight is expensive, even though the effect of preventing the formation of a gel is not high. Accordingly, the upper limit of the unsaturated carboxylic acid content is preferably 3 to 5% by weight, and a modified PO having an unsaturated carboxylic acid content of up to 3% by weight is more preferably used.

The modified PO used in the present invention can be prepared according to an optional process. For example, there can be adopted a process comprising reacting a polyolefin with an unsaturated carboxylic acid in the molten state (see, for example, Japanese Examined Patent Publication No. 43-27421), a process comprising reacting a polyolefin with an unsaturated carboxylic acid in the state of a solution (see, for example, Japanese Examined Patent Publication No. 44-15422), a process comprising reacting a polyolefin with an unsaturated carboxylic acid in the state of a slurry (see, for example, Japanese Examined Patent Publication No. 43-18144), and a process comprising reacting a polyolefin with an unsaturated carboxylic acid in the gas phase (see, for example, Japanese Unexamined Patent Publication No. 50-77493).

The resin composition of the present invention must comprise (a) 95 to 5% by weight of EVOH, (b) 5 to 95% by weight of the EN-amide resin, and (c) 0.5 to 10% by weight of modified PO, the respective amount being based upon the total amount of the three components (a), (b), and (c).

If the content of EVOH exceeds 95% by weight and the content of the EN-amide resin is lower than 5% by weight, the resin composition has a good oxygen gas permeability, but the impact strength is too low. On the other hand, if the content of the EN-amide resin exceeds 95% by weight and the content of EVOH is lower than 5% by weight, a good impact strength is manifested, but the oxygen gas barrier property is too low.

The ratio of the modified PO is 0.5 to 10% by weight, preferably 0.8 to 5% by weight, based on the total amount of the EVOH, the EN-amide resin, and the modified PO. If the content of the modified PO is lower than 0.8% by weight, there is a risk of formation of a gel at the melt-extrusion molding step, and if the content of the modified PO is lower than 0.5% by weight, the formation of a gel is not satisfactorily prevented. If the content of the modified PO exceeds 5% by weight, the obtained film is hazy and the transparency is often poor, and if the content of modified PO exceeds 10% by weight, this tendency becomes conspicuous. Accordingly, the upper limit of the content of modified PO is appropriately set within the range of 5 to 10% by weight according to the intended use.

Various additives such as a stabilizer, a filler, a dye, a pigment, a lubricant, and an antiblocking agent and a minor amount of a thermoplastic resin can be incorporated into the resin composition of the present invention, as long as the basic characteristics of the resin composition are not lowered.

A resin shaped article, such as a sheet or a film, having a high transparency and superior mechanical properties such as high strength and toughness can be formed by melt-extruding the resin composition of the present invention.

When a sheet is prepared from the resin composition of the present invention, the resin composition is melt-kneaded by using a known extruder, the kneaded composition is extruded in the form of a sheet from a molding die of the extruder, and the extruded sheet is intimately contacted with a rotary cooling member such as a cooling roller to effect cooling. The obtained sheet can be processed by a thermal forming method such as an air pressure forming method or a vacuum forming method, and the obtained shaped article has a superior transparency and mechanical properties such as strength and toughness and has a high oxygen gas barrier property. Therefore, the shaped article is preferably used as a container or packaging vessel for a food or the like.

When a film is prepared from the resin composition of the present invention, the resin composition is melt-kneaded by a known extruder, the kneaded composition is extruded from a T-die or tubular die, and the thus-obtained undrawn flat or tubular sheet or film is drawn according to a known drawing method, such as a tenter type sequential biaxial drawing method, a tenter type simultaneous biaxial drawing method, or a tubular type biaxial drawing method.

According to the tender sequential biaxial drawing method, the undrawn sheet is heated at 45° to 65° C. and drawn at a draw ratio of 2 to 5 by a roll type longitudinal drawing machine, and the drawn sheet is drawn at 70° to 100° C. and a draw ratio of 2 to 5 in the lateral direction. According to the tenter type simultaneous biaxial drawing method or tubular type biaxial drawing method, the undrawn sheet or film is drawn at a draw ratio of 2 to 5 at 60° to 80° C. By subjecting the thus-obtained biaxially drawn film to a heat-setting treatment at 100° to 200° C., a dimensional stability or hot water shrinkability can be imparted.

Of course, the resin shaped article of the present invention is not limited to a shaped article prepared according to the above-mentioned drawing method.

According to the present invention, the following particularly prominent effects are attained.

(1) When the resin composition of the present invention is shaped according to the melt extrusion method, a gel is not formed and the resin composition can be stably shaped continuously for a long time.

(2) The resin shaped article of the present invention has a superior transparency and mechanical properties such as strength and toughness, and has a high oxygen gas barrier property.

The resin composition of the present invention and the resin shaped article prepared therefrom will now be described in detail with reference to the following examples and comparative examples.

In the examples, the shapability of the resin composition and the oxygen permeability, and transparency of the biaxially drawn film were evaluated according to the following method.

Shapability

After 10 hours had passed from the point of starting of the melt extrusion, the shapability was evaluated according to the following ranking, based on the increase of the torque of the extruder, the surface roughness of the film, and the number of granular gels formed in the film.

A: average number of gels having a diameter larger than 1 mm is 1 or smaller per $m^2$ of the film.

B: average number of gels having a diameter larger than 1 mm is 2 to 5 per $m^2$ of the film.

C: average number of gels having a diameter larger than 1 mm is 6 or larger per $m^2$ of the film.

D: increase of the torque and surface roughening occur.

Oxygen Permeability

By using an oxygen permeability-measuring apparatus (Model Oxytran 100 supplied by Modern Control), the oxygen permeability (cc/$m^2$.24 hours.atm.) was measured under conditions of a temperature of 30° C. and a relative humidity of 87%.

Transparency

By using an integrating sphere type microturbidimeter supplied by Nippon Seimitsu Kogaku, the haze was measured under conditions of a temperature of 23° C. and a relative humidity of 50%, and the transparency was evaluated according to the following ranking.

A: haze lower than 5%

B: haze at least 5% but lower than 7%
C: haze at least 7% but lower than 10%
D: haze at least 10%

EXAMPLE 1

Nylon 6 (Novamid EN 120 supplied by Mitsubishi Kasei Corp.) in which the content of terminal amino groups in the molecule was 30 μ-equivalent/g of the polymer and the content of terminal carboxyl groups was 10 μ-equivalent/g of the polymer, EVOH (Soarnol DC supplied by Nippon Synthetic Chem. Ind. Co.) having an ethylene content of 32 mole % and a saponification degree of 98 mole %, and a modified PO (Novatec AX-133E supplied by Mitsubishi Kasei Corp.) formed by graft-polymerizing an unsaturated carboxylic acid to an ethylene/vinyl acetate copolymer were mixed together at a ratio of 9 parts by weight/86 parts by weight/5 parts by weight, respectively, and the mixed resin composition was supplied to an extruder having a screw diameter of 65 mm, which was provided with a coathanger T-die. The resin composition was melt-kneaded at 230° C. and extruded in the form of a sheet. The sheet-shaped melt was rapidly cooled by a cooling roll adjusted to 25° C. to obtain an undrawn sheet having a thickness of about 135 μm. Then, the undrawn sheet was heated at 45° C. and drawn at a draw ratio of 3 in the longitudinal direction by a roll type longitudinal drawing machine. While both side ends of the sheet were held by tenter clips, the sheet was heated at 90° C. and drawn at a draw ratio of 3 in the lateral direction to obtain a biaxially drawn film. The obtained drawn film was heat-set at 165° C. for about 4 seconds to obtain a film having a thickness of 15 μm.

The results of the evaluation of the film, the starting resins used, the mixing ratios thereof, the film-forming conditions, and the shapability of the resin composition are shown in Table 1.

EXAMPLES 2 THROUGH 12

Eleven films, each having a thickness of 15 μm, were prepared in the same manner as described in Example 1, except that the starting resins, the mixing ratios thereof, and the film-forming conditions were changed as shown in Table 1.

The results of the evaluation of these films, the starting resins used, the mixing ratios thereof, the film-forming conditions and the moldability of each resin composition are shown in Table 1.

Comparative Examples 1 through 7

Drawn films were prepared in the same manner as in the foregoing examples except that the starting resins, the ratios thereof and the film-forming conditions were changed as shown in Table 1. In Comparative Example 1, after 30 minutes had passed from the starting of the extrusion, the torque of the extruder was increased to the limit and a satisfactory undrawn sheet could not be obtained. In Comparative Examples 2, 3, 6 and 7, the sheet or film was often broken during the drawing operation and the undrawn sheet could not be satisfactorily drawn. In Comparative Examples 4 and 5, drawn films having a thickness of 15 μm were obtained, but each film had a poor transparency.

The results of the evaluation, the starting resins used, the film-forming conditions, and the moldability of each resin composition are shown in Table 1.

In Table 1, the starting resins used are represented by the following abbreviations.

Nylon-a: nylon 6 (Novamid EN 120 supplied by Mitsubishi Kasei Corp.) in which the contents of terminal amino and carboxyl groups in the molecule are 30 μ-equivalent/g of the polymer and 10 μ-equivalent/g of the polymer, respectively Nylon-b: nylon 6 (Novamid EN 1022 supplied by Mitsubishi Kasei Corp.) in which each of the contents of the terminal amino and carboxyl groups in the molecule is 30 μ-equivalent/g of the polymer EVOH-a: EVOH (Soarnol DC supplied by Nippon Synthetic Chem. Ind. Co.) having an ethylene content of 32 mole % and a saponification degree of 98 mole %

EVOH-b: EVOH (Eval EP-F supplied by Kuraray Co.) having an ethylene content of 32 mole % and a saponification degree of 98 mole %

Modified PO-a: modified PO (Novatec AX-133E supplied by Mitsubishi Kasei Corp.) formed by graft-polymerizing an maleic anhydride onto an ethylene/vinyl acetate copolymer Modified PO-b: modified PO (Novatec AP-270L supplied by Mitsubishi Kasei Corp.) formed by graft-polymerizing an maleic anhydride onto low-density polyethylene EAA: ethylene/acrylic acid copolymer (Yukalon-EAA XA-300M supplied by Mitsubishi Petrochem. Co.)

Ionomer: ionomer resin (a thermoplastic resin prepared by partially neutralizing an ethylene-methacrylic acid copolymer with zinc thereby to crosslink the copolymer with a zinc ion; Hi-milan H-1652 supplied by Du Pont-Mitsui Polychemicals Co.)

TABLE 1

| | | Starting resins and amounts | | | | |
|---|---|---|---|---|---|---|
| | | EVOH | Parts by weight | Polyamide | Parts by weight | Modified polyolefin | Parts by weight |
| Example | 1 | EVOH-a | 86 | Nylon-a | 9 | Mod. PO-a | 5 |
| " | 2 | EVOH-b | 88.5 | Nylon-a | 10 | Mod. PO-a | 1.5 |
| " | 3 | EVOH-a | 68 | Nylon-a | 29 | Mod. PO-a | 3 |
| " | 4 | EVOH-b | 48.5 | Nylon-a | 48.5 | Mod. PO-a | 3 |
| " | 5 | EVOH-a | 49 | Nylon-a | 49 | Mod. PO-a | 1 |
| " | 6 | EVOH-b | 32 | Nylon-a | 59 | Mod. PO-a | 9 |
| " | 7 | EVOH-a | 33 | Nylon-a | 62 | Mod. PO-a | 5 |
| " | 8 | EVOH-b | 34 | Nylon-a | 63 | Mod. PO-a | 3 |
| " | 9 | EVOH-b | 35 | Nylon-a | 64.5 | Mod. PO-a | 0.5 |
| " | 10 | EVOH-a | 19 | Nylon-a | 78 | Mod. PO-a | 3 |
| " | 11 | EVOH-b | 29.5 | Nylon-a | 79 | Mod. PO-a | 1.5 |
| " | 12 | EVOH-a | 19 | Nylon-a | 78 | Mod. PO-b | 3 |
| Comparative | 1 | EVOH-a | 50 | Nylon-b | 50 | — | — |

TABLE 1-continued

| | | | | | | | |
|---|---|---|---|---|---|---|---|
| Comparative Example | 2 | EVOH-a | 45 | Nylon-b | 45 | Mod. PO-a | 10 |
| Comparative Example | 3 | EVOH-a | 50 | Nylon-a | 50 | — | — |
| Comparative Example | 4 | EVOH-a | 45 | Nylon-a | 45 | EAA | 10 |
| Comparative Example | 5 | EVOH-b | 45 | Nylon-a | 45 | Ionomer | 10 |
| Comparative Example | 6 | EVOH-a | 47.5 | Nylon-a | 47.5 | EAA | 5 |
| Comparative Example | 7 | EVOH-b | 47.5 | Nylon-a | 47.5 | Ionomer | 5 |

| | | Film-forming conditions | | | | Film properties | |
|---|---|---|---|---|---|---|---|
| | | Extrusion temperature (°C.) | Longitudinal drawing temperature (°C.) | Lateral drawing temperature (°C.) | Heat-setting temperature (°C.) | Shapability | Oxygen permeability (cc/m² · 24 hrs · atm) | Transparency |
| Example | 1 | 230 | 55 | 80 | 165 | A | 2.2 | A |
| " | 2 | 230 | 55 | 80 | 165 | A | 1.8 | A |
| " | 3 | 230 | 55 | 80 | 165 | A | 6.6 | A |
| " | 4 | 230 | 50 | 80 | 180 | A | 17.9 | A |
| " | 5 | 230 | 50 | 80 | 180 | A | 16.2 | A |
| " | 6 | 230 | 45 | 85 | 195 | A | 35.0 | B |
| " | 7 | 230 | 45 | 85 | 195 | A | 32.5 | A |
| " | 8 | 230 | 45 | 85 | 195 | A | 30.4 | A |
| " | 9 | 230 | 45 | 85 | 195 | B | 30.2 | A |
| " | 10 | 230 | 45 | 85 | 195 | A | 40.5 | A |
| " | 11 | 230 | 45 | 85 | 195 | A | 39.5 | A |
| " | 12 | 230 | 45 | 85 | 195 | A | 41.0 | A |
| Comparative Example | 1 | 240 | — | — | — | D | — | — |
| Comparative Example | 2 | 240 | — | — | — | C | — | — |
| Comparative Example | 3 | 230 | — | — | — | C | — | — |
| Comparative Example | 4 | 230 | 50 | 80 | 180 | B | 19.0 | C |
| Comparative Example | 5 | 230 | 50 | 80 | 180 | B | 18.9 | C |
| Comparative Example | 6 | 230 | — | — | — | C | — | — |
| Comparative Example | 7 | 230 | — | — | — | C | — | — |

From the results shown in Table 1, the following can be seen.

(1) When the resin composition of the present invention is formed into a sheet, the formation of gels is dramatically controlled and the clogging of a screen of an extruder or a molding die does not occur. Accordingly, the long-run property at the melt extrusion molding is very high.

(2) A biaxially drawn film obtained from an undrawn sheet formed by melt-extruding the resin composition of the present invention has a superior transparency and a high oxygen barrier property.

(3) A resin composition not satisfying the requirements specified in the present invention has a poor stability at the melt extrusion molding, and large quantities of gels are formed to hinder the operation of the extruder.

(4) An undrawn sheet obtained from a resin composition not satisfying the requirements specified in the present invention cannot be satisfactorily drawn because of gel particles contained in the undrawn sheet, and even if a drawn film is obtained, the drawn film has a poor transparency.

We claim:

1. A resin composition comprising (a) 5 to 95% by weight of a saponified ethylene/vinyl acetate copolymer, (b) 95 to 5% by weight of a polyamide resin in which the content (in $\mu$-equivalent/g of the polymer) of the terminal amino group in the molecule is larger than the content (in $\mu$-equivalent/g of the polymer) of the terminal carboxyl group in the molecule, and (c) 0.5 to 10% by weight of a modified polyolefin formed by grafting an unsaturated carboxylic acid, or an acid anhydride or salt thereof onto a polyolefin; the amount of each of the components (a), (b), and (c) being based on the weight of the total amount of the components (a), (b) and (c) which does not exceed 100% by weight.

2. The resin composition according to claim 1, wherein the saponified ethylene/vinyl acetate copolymer has an ethylene content of 20 to 70 mole % and a saponification degree of at least 90 mole %.

3. The resin composition according to claim 1, wherein the saponified ethylene/vinyl acetate copolymer has an ethylene content of 25 to 60 mole % and a saponification degree of at least 95 mole %.

4. The resin composition according to claim 1, wherein the content of the terminal carboxyl group in the polyamide resin is not larger than 50 $\mu$-equivalent/g of the polymer.

5. The resin composition according to claim 1, wherein the content of the terminal carboxyl group in the polyamide resin is not larger than 30 $\mu$-equivalent/g of the polymer.

6. The resin composition according to claim 1, wherein the polyamide resin is prepared by a polycondensation of a lactam having an at least three-membered ring, an omega-amino acid, or a nylon salt composed of a dicarboxylic acid and a diamine.

7. The resin composition according to claim 1, wherein the modified polyolefin contains 0.01 to 5% by weight of units derived from the unsaturated carboxylic acid, acid anhydride or salt.

8. The resin composition according to claim 1, wherein the modified polyolefin contains 0.1 to 3% by weight of units derived from the unsaturated carboxylic acid, acid anhydride or salt.

9. The resin composition according to claim 1, wherein the polyolefin is selected from the group consisting of a high density polyethylene, a low density polyethylene, a linear low density polyethylene, an ethylene-vinyl acetate copolymer, and polypropylene.

10. The resin composition according to claim 1, wherein the unsaturated carboxylic acid is selected from the group consisting of acrylic acid, methacrylic acid, maleic acid, fumaric acid, itaconic acid, and citraconic acid, and anhydrides thereof.

11. The resin composition according to claim 1, wherein the amount of the modified polyolefin is 0.8 to 5% by weight based on the total amount of the saponified ethylene/vinyl acetate copolymer, the polyamide resin, and the modified polyolefin.

12. A shaped article made from the resin composition set forth in claim 1.

13. A shaped article made from the resin composition set forth in claim 2.

14. The shaped article according to claim 12, which is a film or sheet.

* * * * *